United States Patent
Ajima et al.

(10) Patent No.: US 9,531,305 B2
(45) Date of Patent: Dec. 27, 2016

(54) INVERTER APPARATUS

(71) Applicant: Hitachi Automotive Systems, Ltd., Hitachi-shi, Ibaraki (JP)

(72) Inventors: Toshiyuki Ajima, Tokyo (JP); Kimihisa Furukawa, Tokyo (JP); Shigehisa Aoyagi, Tokyo (JP); Tohma Yamaguchi, Hitachinaka (JP); Daisuke Goto, Hitachinaka (JP); Masaki Kashima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 296 days.

(21) Appl. No.: 14/192,557

(22) Filed: Feb. 27, 2014

(65) Prior Publication Data
US 2014/0239861 A1  Aug. 28, 2014

(30) Foreign Application Priority Data
Feb. 28, 2013 (JP) .................................. 2013-039059

(51) Int. Cl.
G05B 11/28 (2006.01)
H02P 6/10 (2006.01)
H02P 27/08 (2006.01)

(52) U.S. Cl.
CPC ............... *H02P 6/10* (2013.01); *H02P 27/085* (2013.01)

(58) Field of Classification Search
USPC ............... 318/400.17, 599, 147, 723, 503
See application file for complete search history.

(56) References Cited

U.S. PATENT DOCUMENTS

| 2002/0093391 A1 | 7/2002 | Ishida et al. | |
|---|---|---|---|
| 2005/0248306 A1* | 11/2005 | Chen | H02P 25/03 318/712 |
| 2007/0241720 A1 | 10/2007 | Sakamoto et al. | |
| 2010/0250067 A1* | 9/2010 | Matsumura | B62D 5/046 701/41 |
| 2011/0193506 A1* | 8/2011 | Hayashi | H02P 6/002 318/400.12 |

(Continued)

FOREIGN PATENT DOCUMENTS

| JP | 64-64504 A | 3/1989 |
|---|---|---|
| JP | 11-69836 A | 3/1999 |

(Continued)

OTHER PUBLICATIONS

Korean Office Action dated Dec. 21, 2014 (Four (4) pages).

(Continued)

*Primary Examiner* — Jorge L Carrasquillo
(74) *Attorney, Agent, or Firm* — Crowell & Moring LLP (57) ABSTRACT

An objective of the present invention is to improve current detection accuracy and to reduce noise of carrier frequency. A motor apparatus and a motor drive apparatus calculate motor currents Iu, Iv, and Iw using a DC bus current detected value Idc of an inverter and control a magnitude and a phase of an applied voltage of a motor to drive the motor. A carrier adjuster decreases a carrier frequency Fc of the inverter if a motor output is relatively larger and that increases the carrier frequency Fc of the inverter if the motor output is relatively smaller. A pulse shift adjuster shifts an interphase waveform of a PWM pulse according to the carrier frequency Fc.

12 Claims, 7 Drawing Sheets

(56) References Cited

U.S. PATENT DOCUMENTS

2012/0163046 A1    6/2012  Hibino
2013/0069572 A1*  3/2013  Maekawa ............... H02P 21/26
                                                                       318/400.14

FOREIGN PATENT DOCUMENTS

| JP | 2001-186787 A | | 7/2001 |
|----|---------------|---|--------|
| JP | 2001186787 A | * | 7/2001 |
| JP | 2002-125362 A | | 4/2002 |
| JP | 3665812 B2 | | 6/2005 |
| JP | 2007-110811 A | | 4/2007 |
| JP | 2007110811 A | * | 4/2007 |
| JP | 2007-259675 A | | 10/2007 |
| JP | 4671000 B1 | | 4/2011 |
| JP | 2012-165609 A | | 8/2012 |
| JP | 2012165609 A | * | 8/2012 |

OTHER PUBLICATIONS

Chinese-language Office Action issued in counterpart Chinese Application No. 201410073252.7 dated Dec. 17, 2015 with English translation (Twenty-Six (26) pages).

* cited by examiner

| voltage vector | PWM pattern (U,V,W) | motor current | direct current |
|---|---|---|---|
| V0 | (0,0,0) | 0=Iu+Iv+Iw | 0 |
| V1 | (1,0,0) | Iu=−(Iv+Iw) | Iu |
| V2 | (1,1,0) | −Iw=Iu+Iv | −Iw |
| V3 | (0,1,0) | Iv=−(Iu+Iw) | Iv |
| V4 | (0,1,1) | −Iu=Iv+Iw | −Iu |
| V5 | (0,0,1) | Iw=−(Iu+Iv) | Iw |
| V6 | (1,0,1) | −Iv=Iu+Iw | −Iv |
| V7 | (1,1,1) | 0=Iu+Iv+Iw | 0 |

INVERTER APPARATUS

TECHNICAL FIELD

The present invention relates to a motor apparatus and a motor drive apparatus that calculate three-phase motor current using DC (direct current) bus current detected value of inverter to control the motor.

BACKGROUND ART

In the field of motor apparatus using synchronous motor, a method is known in which a DC bus current of an inverter is detected for reducing the number of electric current sensors detecting three-phase motor current. In this method, in order to appropriately control the motor current, it is desirable to calculate the three-phase motor current from the DC bus current of the inverter, thereby appropriately controlling the magnitude and the phase of the applied voltage to drive the motor.

Patent Literatures 1 and 2 indicated below describe techniques in which a PWM carrier frequency of an inverter is configured to be variable when detecting a DC bus current, thereby improving the detection accuracy of the DC bus current.

CITATION LIST

Patent Literature

Patent Literature 1: JP Patent No. 3665812
Patent Literature 2: JP Patent No. 4671000

SUMMARY OF INVENTION

Technical Problem

Patent Literature 1 describes a method for detecting an instantaneous value of the DC bus current to calculate the three-phase motor current, using a relationship between the PWM pulse of the inverter apparatus and the pulse-like DC bus current (hereinafter, referred to as direct current) flowing into the inverter. Specifically, in order to sufficiently secure the sampling duration of the direct current, the required pulse width of the line voltage is secured by decreasing, when the signal difference between PWM pulses of at least two phases among the three phases (pulse width of the line voltage) is around 0 (i.e. the line voltage of the inverter output is small), the frequency of the carrier signal to increase the signal difference of the PWM pulse (pulse width of the line voltage).

Patent Literature 2 describes a method for securing the required pulse width of the line voltage by decreasing the PWM carrier frequency in the current detection period for detecting direct current, thereby increasing the pulse width of the line voltage.

However, if the carrier frequency is lowered, the frequency becomes closer to the audible frequency and thus the sound noise of the carrier frequency would raise a problem. On the other hand, if the pulse width of the line voltage is small, the motor output is also small. Thus another problem would be raised in which the sound noise of the carrier frequency becomes larger relative to the motor operating noise. In addition, if the carrier frequency is configured to be variable when detecting electric current, the noise with relatively low frequency corresponding to the current detection period becomes larger.

An objective of the present invention is to provide a motor apparatus and a motor drive apparatus that have improved current detection accuracy and that reduce noise of carrier frequency.

Solution to Problem

The present invention provides a motor apparatus and a motor drive apparatus that calculate a motor current using a DC bus current detected value of an inverter to control a magnitude and a phase of an applied voltage to drive the motor, comprising: a carrier adjuster that decreases a carrier frequency of the inverter if an average value of a direct current, an instantaneous value of the direct current, or a value indicating a drive state of the motor is relatively larger and that increases the carrier frequency of the inverter if the average value of the direct current, the instantaneous value of the direct current, or the value indicating the drive state of the motor is relatively smaller; and a pulse shift adjuster that shifts an interphase waveform of a PWM pulse according to the carrier frequency.

Advantageous Effects of Invention

With a motor apparatus and a motor drive apparatus according to the present invention, it is possible to improve current detection accuracy and to reduce noises of the carrier frequency.

DESCRIPTION OF EMBODIMENTS

Hereinafter, embodiments of the present invention will be described using Figures.

Figure 1:
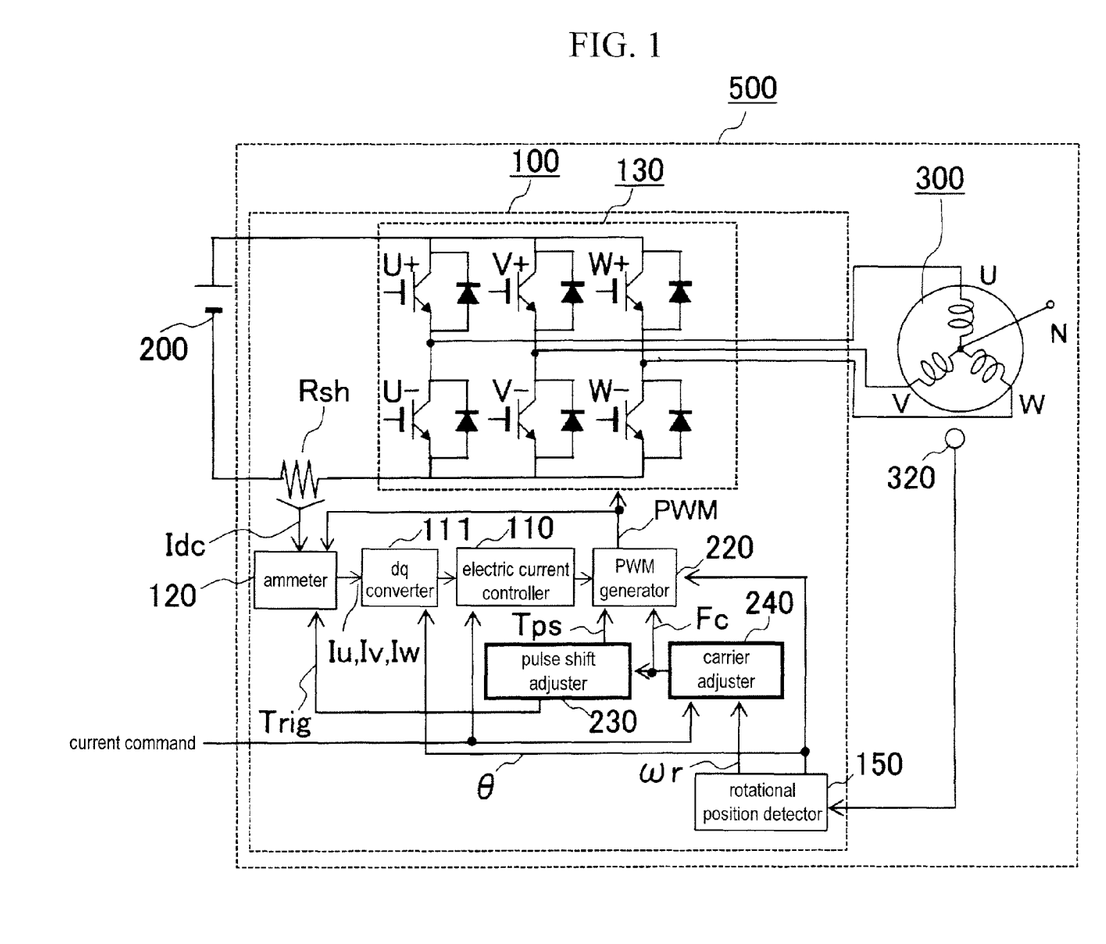
FIG. 1 is a block diagram of a motor apparatus according to the present invention.

FIG. 1 is a block diagram showing a configuration of a motor apparatus having a motor drive apparatus of the embodiment.

The motor apparatus 500 switches PWM carrier frequencies of an inverter according to outputs from a motor to improve the detection accuracy of DC bus currents of the inverter, thereby driving the motor efficiently.

The motor apparatus 500 includes a motor 300 and a motor drive apparatus 100. The motor drive apparatus 100 has an electric current control function for controlling the outputs from the motor 300.

The motor drive apparatus 100 includes an inverter circuit 130, a shunt resistance Rsh detecting the DC bus currents of the inverter circuit 130, an ammeter 120, a pulse shift adjuster 230, a carrier adjuster 240, a dq converter 111, an electric current controller 110, a PWM generator 220, and a rotational position detector 150.

The battery 200 is a DC voltage source of the motor apparatus 500. The DC voltage VB of the battery 200 is converted by the inverter circuit 130 of the motor drive apparatus 100 into three-phase AC (alternating current) with variable voltages and variable frequencies, and then is applied to the motor 300.

The motor 300 is a synchronous motor rotation-driven by applying three-phase AC. A rotational position sensor 320 is attached to the motor 300. A resolver comprising an iron core and a winding wire is preferable for the rotational position sensor 320. However, a GMR sensor or a sensor using Hall devices may be possible.

In order to control the phase of the applied voltage of three-phase AC in accordance with the phase of the electromotive force of the motor 300, the rotational position detector 150 calculates a rotational angle θ from input signals of the rotational position sensor 320 and calculates a rotational velocity ωr.

The electric current detector 120 detects the pulse-like DC bus current (hereinafter, referred to as direct current) flowing into the inverter circuit 130 as a voltage between both ends of the shunt resistance Rsh (electric current detected value Idc). The electric current detector 120 calculates three-phase motor current values Iu, Iv, and Iw from the electric current detected value Idc and from the PWM pulse.

The dq converter 111 calculates electric current detected values Id and Iq acquired by dq conversion from the three-phase motor currents Iu, Iv, and Iw and the rotational position θ. The electric current controller 110 calculates voltage commands Vd* and Vq* so that the electric current detected values Id and Iq acquired by dq conversion match with electric current commands Id* and Iq* generated according to the target torque.

The PWM generator 220 converts the voltage commands Vd* and Vq* and the rotational angle θ into three-phase applied voltages. The PWM generator 220 then adjusts output voltages by ON/OFF controlling semiconductor switching devices in the inverter circuit 130 using drive signals modulated by Pulse Width Modulation.

When the motor apparatus 500 controls the rotational velocity of the motor 300, the motor apparatus 500 calculates the rotational velocity ωr using temporal variations of the rotational angle θ, and generates the voltage command or the electric current command so that the rotational velocity matches with the velocity command from the upper controller. When the motor apparatus 500 controls the output torque, the motor apparatus 500 generates the electric current commands Id* and Iq* using a relational equation or map between the motor current Id, Iq and the motor torque.

The carrier adjuster 240 compares the motor output acquired by multiplying the rotational velocity ωr outputted from the rotational position detector 150 by the motor torque with a preconfigured threshold value. The carrier adjuster 240 sets the carrier frequency Fc at higher value if the motor output is at or below the threshold, and sets the carrier frequency Fc at lower value if the motor output is at or above the threshold.

The pulse shift adjuster 230 configures the interphase waveform of the PWM pulse to be variable according to the carrier frequency Fc. Details of the pulse shift adjuster 230 will be described later.

Figure 2:
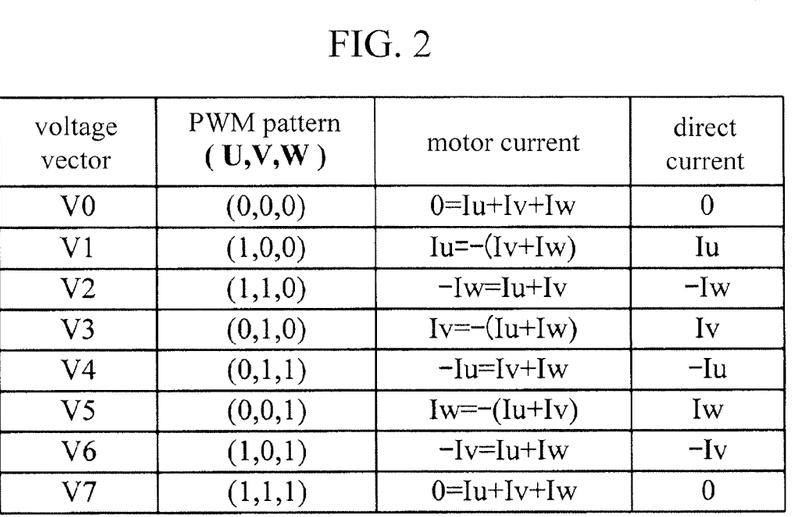
FIG. 2 is a diagram showing a relationship between a direct current and a motor current.

Next, using FIGS. 2 and 3, an operation for detecting the direct current Idc to calculate the three-phase motor current will be described. FIG. 2 shows a relationship among the output voltage vector of the inverter (PWM pattern), the motor currents Iu, Iv, and Iw, and the direct current Idc.

Voltage vectors (V0 to V7) are outputted from the inverter circuit 130 by ON/OFF controlling the switching devices in the inverter circuit 130 according to the PWM patterns. Each of the PWM patterns corresponds to the direction in which the electric current flows through the three-phase motor winding wires and to the direct current Idc. Thus the three-phase motor currents Iu, Iv, and Iw can be calculated by detecting the pulse-like direct current.

Figure 3:
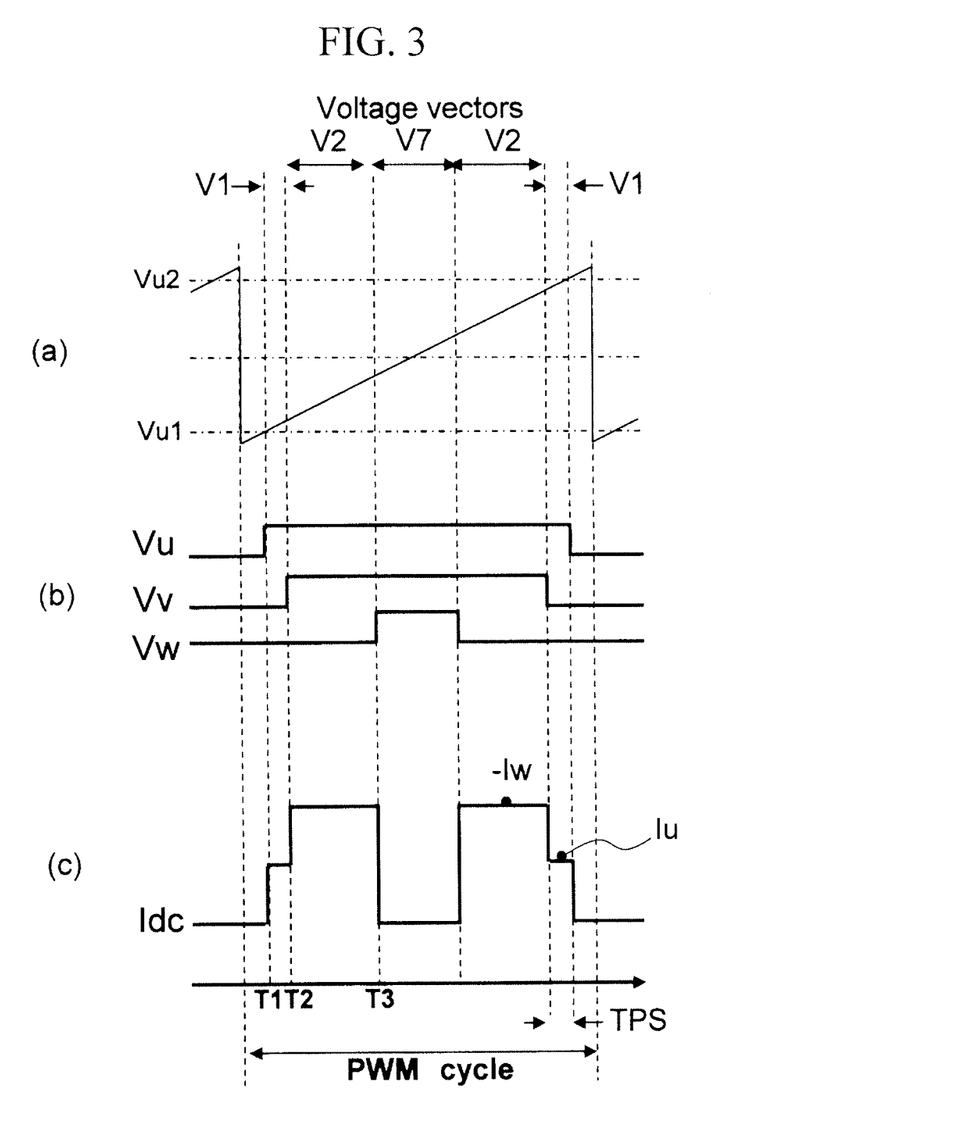
FIG. 3 is a waveform diagram showing a timing for detecting electric current.

FIG. 3 shows a PWM pattern and the pulse-like direct current Idc during one cycle of the carrier frequency (PWM one cycle). FIG. 3 (a) shows a PWM generation timer operation. The PWM pulse of FIG. 3 (b) is generated when the sawtooth or triangle wave matches with the voltage command value. In FIG. 3: the PWM pulse of U phase rises at the time T1 when the voltage command Vu1 matches with the sawtooth-like timer count value; the voltage Vu is outputted as the inverter output of U phase; and the PWM pulse of U phase falls at the time when the voltage command Vu2 matches with the sawtooth-like timer count value. It applies to V phase and W phase. FIG. 3 (c) shows the corresponding direct current Idc. The motor currents of two phases can be detected by sampling electric currents twice in PWM one cycle. Another one phase can be calculated according to the relationship of Iu+Iv+Iw=0.

At this time, in order to reliably detect the peak of the pulse-like direct current, the minimum pulse width TPS (e.g. 5 μs) is necessary. In addition, in order to improve the detection accuracy for thinner PWM pulses, the pulse shift adjuster 230 previously calculates the signal difference between the PWM pulses of two phases (pulse width of line voltage), and samples the electric current at an appropriate detection timing Trig of the ammeter 120.

The minimum pulse width TPS depends on the inductance of the main circuit of the inverter, on the slew rate or responsibility of the detection circuits, on the sampling duration of A/D converters, and the like. The offset error of the electric current detection circuit can be detected by sampling electric currents when the voltage vector is V0 or V7, thus it is desirable to calibrate the offset of the electric current sensor.

Figure 4:
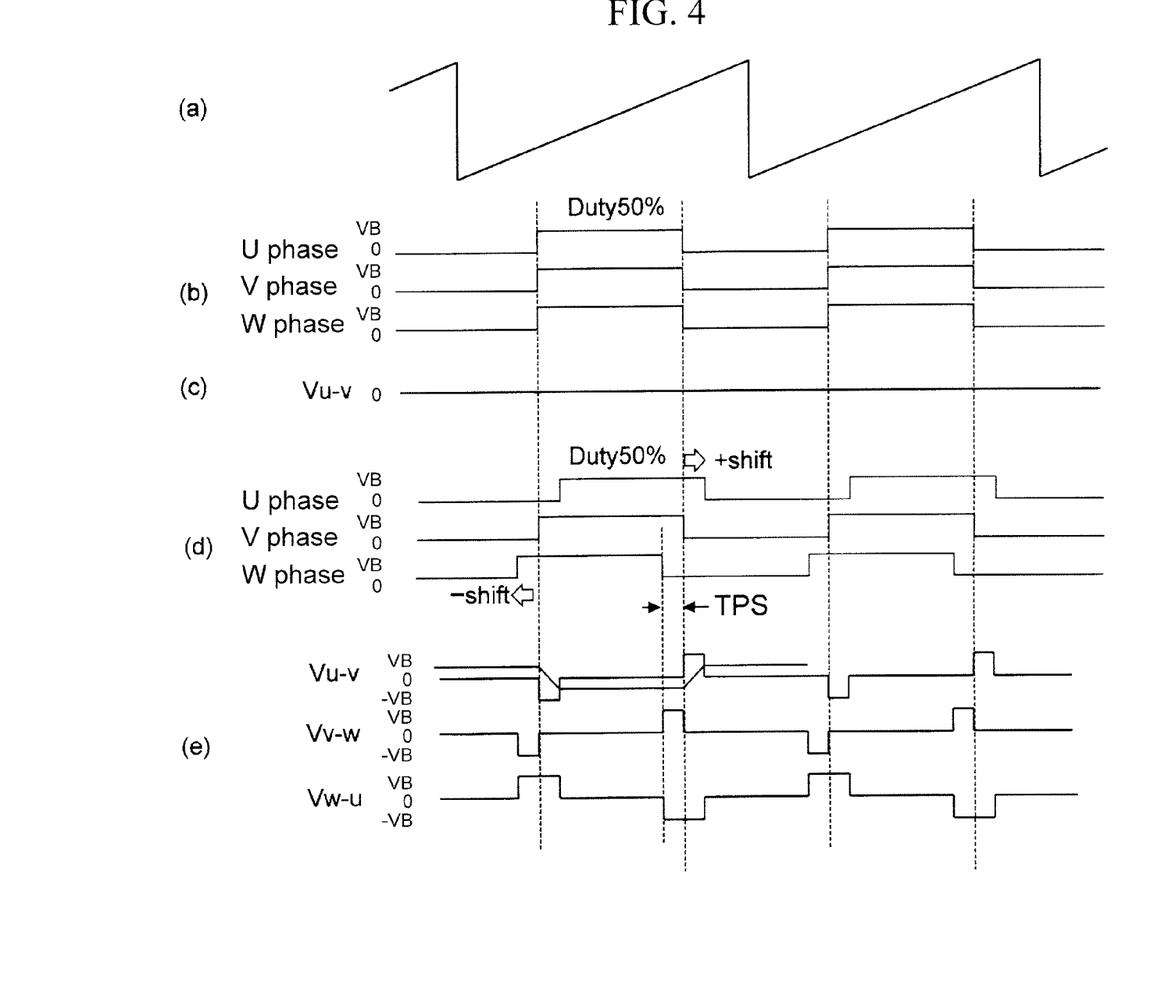
FIG. 4 is a waveform diagram showing a pulse shift operation in the embodiment.

Next, generation of the minimum pulse width TPS will be described using FIG. 4. FIG. 4 (a) shows a sawtooth-like timer count value indicating the carrier cycle for generating the PWM pulse. FIG. 4 (b) shows a PWM pulse of a common inverter when the voltage command is 0V (duty 50%). FIG. 4 (c) shows a corresponding line voltage waveform Vu-v between U phase and V phase of the inverter output.

The inverter output vectors are V0 and V7 and the line voltage Vu-v is 0. Thus the direct current Idc cannot be detected even if the motor current is actually flowing. In addition, when a minute motor current flows, a signal difference occurs in the PWM pulses of each of three-phases in FIG. 4 (b), and a line voltage is applied to the motor to cause the motor current to flow. However, the direct current cannot be detected if the minimum pulse width TPS is not satisfied, thus the motor current cannot be controlled appropriately. Therefore, as shown in FIG. 4 (d), the interphase waveform of the PWM pulse is phase-shifted to generate the minimum pulse width TPS, thereby enabling detection of the direct current Idc. Further, during the periods of V1-V6, the interphase waveform of the PWM pulse is also phase-shifted if the pulse width does not satisfy the minimum pulse width TPS to generate the minimum pulse width TPS, thereby enabling detection of the direct current Idc.

FIG. 4 (e) shows line voltage waveforms corresponding to the PWM pulse of FIG. 4 (d). As shown in FIG. 4 (e), the average voltage within PWM one cycle is approximately 0 and thus the applied voltage can be controlled. However, both plus and minus voltages are applied instantaneously, which increases noises of the carrier frequency.

In addition, since the electric current is required to be small as far as possible, the S/N ratio of the detection circuit has significant effects. Thus the motor cannot be controlled with minute torques, which decreases the efficiency of motor. The inverter according to the embodiment increases the carrier frequency if the motor output is small. Thus it is possible to increase the frequency of DC detection per time, and the increased current detection results can be used to filter the calculated value to acquire the current detection value. Namely, an effect may be obtained which is similar to oversampling of the direct current. Accordingly, the current detection accuracy for minute electric current required for motor control with minute torques can be improved. In addition, the motor noise can be reduced by shifting the noise of carrier frequency into higher frequencies when the motor output is small generating relatively small noises.

Figure 5:
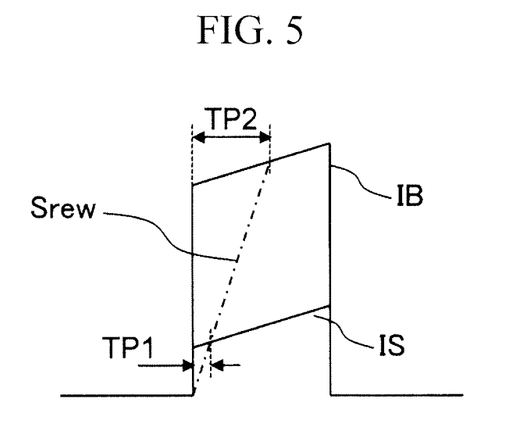
FIG. 5 is a waveform diagram showing a detection operation of an electric current detection circuit in the embodiment.

Next, electric current detection when the motor output is large will be described using FIG. 5. FIG. 5 shows a DC electric current waveform IS when the instantaneous value of the pulse-like direct current Idc is small and a DC electric current waveform IB when the instantaneous value is large. The slew rate of the DC detection circuit is fixed according to characteristics such as that of operational amplifiers. The time delay is TP1 when the DC electric current waveform is IS and is TP2 when the DC electric current waveform is IB.

In other words, the minimum pulse width TPS should be configured as TPS>TP2 in compliance with the relatively large motor output. Preferably, the PWM pulse width for PWM one cycle is widened by decreasing the carrier frequency according to the magnitude of the motor output. As a result, the current detection accuracy can be improved.

The motor apparatus and the motor drive apparatus according to the embodiment decrease the carrier frequency when the motor output is large so that the minimum pulse width TPS>the time delay TP2, thereby detecting the motor current after the time delay TP2 due to the slew rate of the detection circuit to improve the detection accuracy of the motor current. In addition, highly efficient motor apparatus can be provided by decreasing the switching frequency of the inverter circuit 130 to reduce the loss of the inverter circuit 130.

Figure 6:
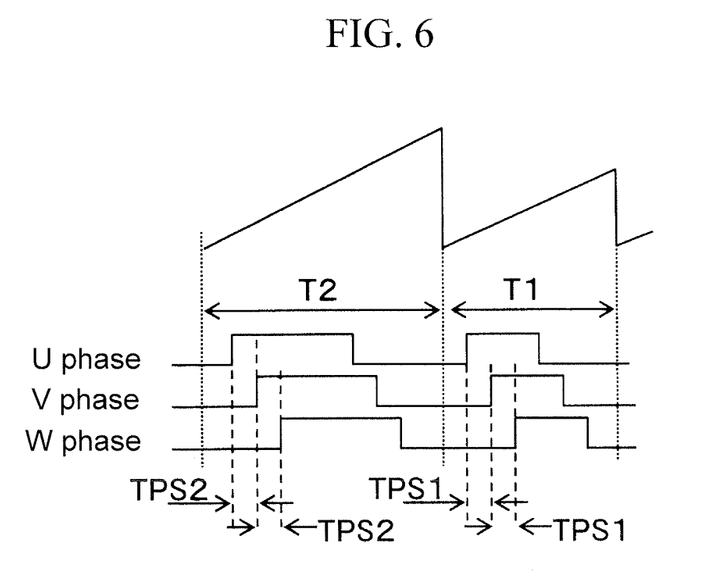
FIG. 6 is a waveform diagram showing a carrier frequency operation in the embodiment.

FIG. 6 is a diagram showing a carrier signal and a PWM pulse with variable inverter carrier frequency Fc and variable minimum pulse width TPS in accordance with the motor output (electric current). In the embodiment, the carrier frequency Fc is changed in synchronization with the PWM cycle of the inverter. In FIG. 6, the carrier cycle is T2 and the minimum pulse width is TPS2 when the motor output is large, and the carrier cycle is T1 and the minimum pulse width is TPS1 when the motor output is small. The carrier cycle (frequency) can be changed by changing it into integral multiple of half of higher carrier frequency, without significantly modifying the microcomputer control cycle. Thus it is possible to suppress complicating the software process.

In addition, the electric current is detected at integral multiple of the carrier frequency, and the interphase waveform of the PWM pulse is changed only when detecting the electric current, thereby reducing computational loads.

As discussed thus far, according to the embodiment, the carrier frequency Fc is lowered if the output from the motor 300 is relatively large, thereby improving the current detection accuracy depending on the slew rate of the detection circuit. In addition, since the motor noise is large when the motor output is relatively large, the carrier frequency noise will be relatively small even if the carrier frequency is lowered.

On the other hand, the carrier frequency Fc of the inverter is made higher to increase the frequency for detecting electric currents if the output from the motor 300 is relatively small, thereby improving the current detection accuracy. In addition, the interphase waveform of the PWM pulse is changed to secure the minimum pulse width TPS, thereby improving the current detection accuracy. Further, the carrier frequency noise can be reduced by increasing the carrier frequency Fc.

When the inverter temperature is at or above a threshold value, the carrier frequency Fc may not be increased, thereby restricting thermal damages due to further increased temperature of the inverter (specifically, switching devices).

The sampling frequency may be increased by increasing the carrier frequency. The increased current detection results can be used to filter the calculated value to acquire the electric current detected value, thereby improving the detection accuracy for electric current detected value.

The electric current may be detected at integral multiple of the carrier frequency to change the interphase waveform of the PWM pulse only when detecting the electric currents, thereby reducing computational loads.

The carrier frequency may be switched by integral multiple of half of the carrier frequency, thereby reducing computational burdens.

The carrier frequency may be switched with a hysteresis in the threshold, thereby suppressing the carrier frequency being changed frequently to improve stability of the motor control.

Only one of or multiple of the threshold may be used. Alternatively, the carrier frequency Fc may be changed continuously according to the motor output. However, if multiple of the threshold is provided or the carrier frequency Fc is changed continuously according to the motor output, the computational load will be increased. Thus is it desirable if the threshold or the carrier frequency is configured according to the computational capacity of the apparatus or the like.

A hysteresis may be provided in the threshold. In other words, the threshold when the motor output transits from higher value to lower value may be different from the threshold when the motor output transits from lower value to higher value, thereby suppressing the carrier frequency being changed frequently to improve stability of the motor control.

In FIG. 1, the carrier adjuster 240 compares the motor output with the threshold. However, other than the motor output, the rotational velocity ωr or average or instantaneous value of the direct current may be used. In addition, the rotational velocity ωr, the output torque, or average or instantaneous value of the direct current may be detected values or command values.

The carrier adjuster 240 may not configure the carrier frequency Fc to be higher when the inverter temperature is at or above a predetermined temperature. This is because of below: If the carrier frequency Fc is made higher when the inverter temperature is at or above a predetermined temperature, the inverter temperature (specifically, switching devices) further increases and thermal damages may occur.

APPLICATION EXAMPLE 1

Figure 7:
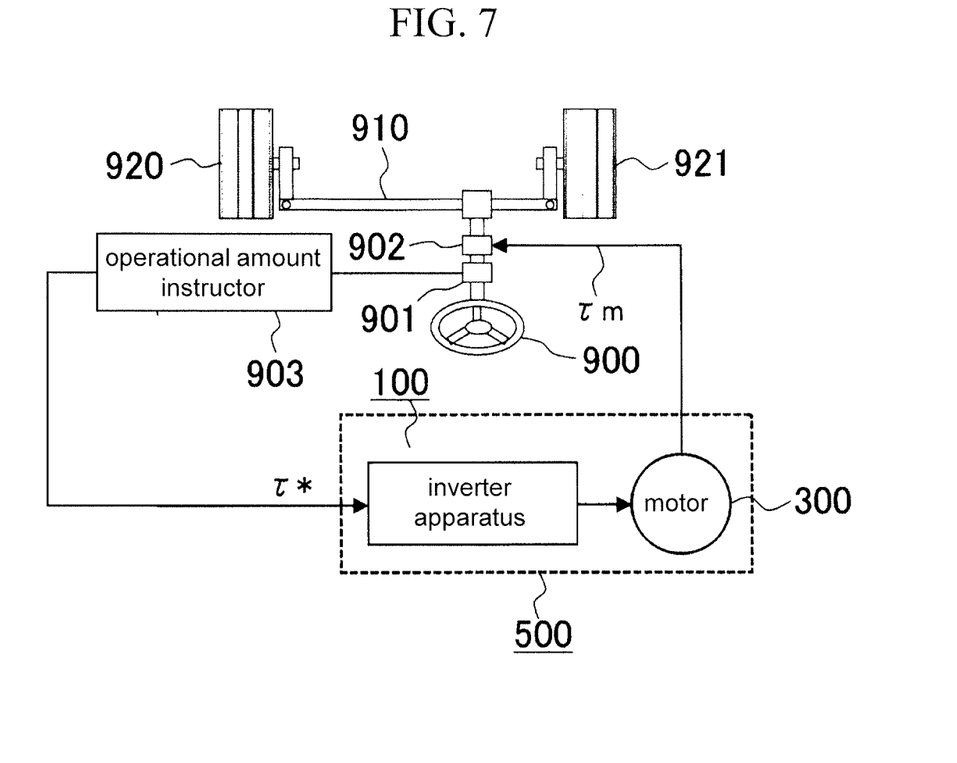
FIG. 7 is a configuration diagram of an electric power steering system in which the motor apparatus of the embodiment is applied.

FIG. 7 is a configuration diagram of an electric power steering system in which the motor apparatus 500 of the embodiment is applied.

As shown in FIG. 7, the electric power steering system includes an electrical actuator, a handle (steering) 900, a steering detector 901, and an operational amount instructor 903. Operational forces of the handle 900 handled by operators assist the torque using the electrical actuator.

The electrical actuator includes a torque transmission mechanism 902, the motor 300, and the motor drive apparatus 100. The electrical actuator uses a torque command $\tau^*$ as the steering assist torque command of the handle 900, and decreases the steering force of the operator using the output from the motor 300.

In the electrical actuator, the motor drive apparatus 100 receives, as an input command, the assist torque command $\tau^*$ generated by the operational amount instructor 903. The motor drive apparatus 100 controls the motor current using the torque constant of the motor 300 and the torque command $\tau^*$ so that the torque complies with the torque command.

The motor 300 transmits, through the torque transmission mechanism 902 using braking mechanisms or hydraulic mechanism such as worm wheels or planetary gears, a torque of the motor output $\tau m$ outputted from the output shaft directly connected to the rotor to the rack 910 of the steering system, thereby reducing (assisting) steering force (operational force) of the operator through the handle 900 to manipulate the steering angles of the wheels 920 and 921.

The steering detector 901 detecting steering states in the steering shaft detects the operational amount in the form of the steering angle or the steering torque. The operational amount instructor 903 determines the amount of assist in the form of torque command $\tau^*$ taking into account the state quantity such as car velocities or road surface states.

The motor drive apparatus 100 achieves smooth steering feelings by previously configuring, if the steering angle is large, the carrier frequency regardless of the amount of motor output.

In addition, if the car velocity is low and the steering amount is large, a carrier frequency corresponding to large motor output may be established by predicting, according to car velocities or shift positions, static steering such as parking operations requiring larger assisting force. Using this method, it is possible to restrict ripple currents due to switching by suppressing switching of carrier frequencies. It is also possible to achieve smooth steering assist in repeating small loads and large loads due to quick turn of the handle.

In summary of above, the power steering system assists, on the basis of the operational state of the car steering, steering operations using the operation of the motor controlled by the inverter apparatus according to claim 1. The power steering system lowers the carrier frequency if the steering angle of the steering is at or above a predetermined angle.

The power steering system assists, on the basis of the operational state of the car steering wheel, steering operations using the operation of the motor controlled by the inverter apparatus according to claim 1. The power steering system determines whether the car is in a state preparing for parking (parking operation) according to the steering angle of the steering wheel and the car velocity. The power steering system restricts changing of the carrier frequency if the car is in the state preparing for parking.

APPLICATION EXAMPLE 2

Figure 8:
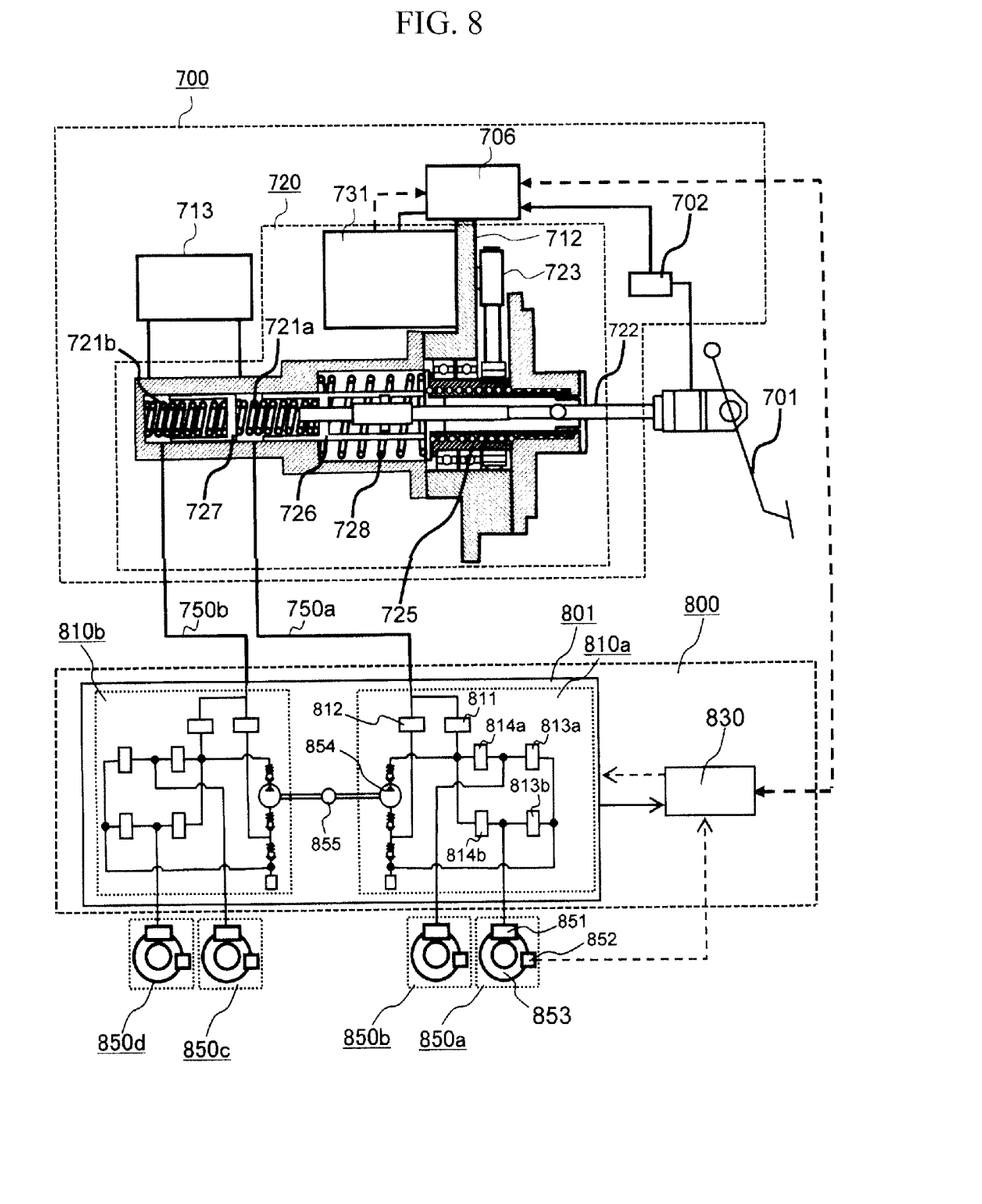
FIG. 8 is a configuration diagram of an electrical brake system in which the motor apparatus of the embodiment is applied.

FIG. 8 is a system block diagram showing a configuration of a car brake system in which the motor apparatus 500 of the embodiment is applied.

The assist control unit 706 in FIG. 8 is programmed, in the microcomputer, so that the unit has the function same as the motor drive apparatus 100 to perform car brake operations. The motor 731 in the application example 2 is different from the application example 1 in that the motor 731 is integrally mounted to a brake assist apparatus 700. In addition, the application example 2 is different from the application example 1 in that the assist control unit 706 is integrally configured using the casing 712.

The car brake system includes a brake pedal 701, the brake assist apparatus 700, a brake adjuster 800, and wheel brake mechanisms 850a-850d.

The brake assist apparatus 700 includes an assist mechanism 720, a master cylinder 721 comprising a primary fluid chamber 721a and a secondary fluid chamber 721b, and a reservoir tank 713. The operational amount of the brake pedal 701 pressed by the driver is inputted into the assist mechanism 720 through the input rod 722, and is transmitted into the primary fluid chamber 721a of the master cylinder 721.

The braking operational amount detected by the stroke sensor 702 attached to the brake pedal 701 is inputted into the assist control unit 706 controlling the assist mechanism 720. The assist control unit 706 controls the motor 731 so that the rotational position corresponds to the inputted braking operational amount. The rotational torque of the motor 731 is transmitted, through the decelerating mechanism 723, to the rotation-translation conversion mechanism 725 converting rotative power into translational power. The rotation-translation conversion mechanism 725 pushes the primary piston 726 to increase the fluid pressure in the primary fluid chamber 721a. The fluid pressure applies pressure to the secondary piston 727 to increase the fluid pressure in the secondary fluid chamber 721b.

The brake adjuster 800 receives, through the master pipes 750a and 750b, operating fluids in which pressure is applied in the fluid chambers 721a and 721b of the master cylinder 721. The brake adjuster 800 acquires braking force of the car by transmitting the fluid pressure to the wheel braking mechanisms 850a-850d according to the instruction from the brake control unit 830.

The assist control unit 706 controls the displacement amount of the primary piston 726 in order to adjust the pressing amount of the primary piston 726. In the application example 2, the displacement amount of the primary piston 726 is not directly detected. Thus the rotational angle of the drive motor 731 is calculated according to the signal from rotational position sensors (not shown) mounted in the drive motor 731, and the displacement amount of the primary piston 726 is calculated from the propulsive amount of the rotation-translation conversion mechanism 725.

Even if the drive motor 731 stops the operation due to defects and the translational shaft of the rotation-translation conversion mechanism 725 cannot be returned, the braking operation by the driver would not be interfered by returning the shaft of the rotation-translation conversion mechanism 725 back into the initial position. For example, unstable car behaviors due to brake drug may be avoided.

The brake adjust mechanism 801 includes two systems of fluid pressure adjust mechanisms 810*a* and 810*b* controlling operating fluids for diagonal two wheels in the four wheels respectively. The brake adjust mechanism 801 can reliably stop the car even if a failure occurs in one system and can individually adjust braking forces of the diagonal wheel mechanisms 850*a* and 850*b*. Since the fluid pressure adjust mechanisms 810*a* and 810*b* work in the same manner, the fluid pressure adjust mechanism 810*a* will be described below.

The fluid pressure adjust mechanism 810*a* includes: a gate OUT valve 811 controlling supplies for the wheel cylinder 851; a gate IN valve 812 controlling supplies for the pump; IN valves 814*a* and 814*b* controlling operating fluid pressures from the master pipe 750*a* or supplies of operating fluids from the pump to each of the wheel cylinders 851; OUT valves 813*a* and 813*b* decreasing pressures of the wheel cylinder 851; a pump 854 increasing master pressures generated by the operating fluid pressures from the master pipe 750*a*; and a pump motor 855 driving the pump 854.

For example, when controlling fluid pressures for antilock brake control, the brake control unit 830 processes signals from the wheel rotation sensor 852 in the wheel mechanism 850*a*. If a wheel lock is detected when braking, each of the IN/OUT valves (electromagnetic) and the pump 854 operate for adjusting the fluid pressure so that each of wheels would not be locked. The mechanisms can also be applied when controlling fluid pressures for car behavior stabilization.

In such car brake systems as above, the rotational position sensor signals of the motor 731 is used for driving motors and for controlling displacements of the primary piston 726. Therefore, it is necessary for the signal to be highly accurate, to stably and continuously work, and to appropriately detect failures.

The assist control unit 706 in the application example 2 predicts sudden brake operations according to the pedal operational amount and its duration. If the motor output is large, the assist control unit 706 lowers the carrier frequency to restrict carrier frequency switching. The carrier frequency is also fixed to be lower frequencies in ABS operations or automatic braking operations, thereby providing a car brake system that can achieve reducing inverter losses as well as decreasing brake response time.

In summary of above, the brake control apparatus includes the fluid pressure generation device that generates fluid pressures by the operation of the motor controlled by the inverter apparatus according to claim 1 and that supplies the fluid pressure to multiple wheel cylinders of the car. The brake control apparatus restricts changes of the carrier frequency according to the running state of the car.

In addition, the carrier frequency is lowered if the car velocity is at or above a predetermined velocity.

In addition, the carrier frequency is lowered if the operational speed of the brake pedal of the car is at or above a predetermined speed.

In addition, the carrier frequency is lowered when the fluid pressure generation device works not on the basis of brake pedal operations of the car.

In addition, the carrier frequency is increased if the fluid pressure supply device works when the car is stopped.

In addition, a fluid pressure control mechanism (ABS) that controls supplies of brake fluids for the multiple wheel cylinders is provided between the fluid pressure generation device and the multiple wheel cylinders. The carrier frequency is lowered when the fluid pressure control mechanism works.

The present invention is not limited to the above-described embodiments. Various modifications are possible without departing from the spirits of the present invention.

REFERENCE SIGNS LIST

100: motor drive apparatus
110: electric current controller
120: ammeter
130: inverter
150: rotational position detector
200: battery
500: motor apparatus
300: motor
320: rotational position sensor
230: pulse shift adjuster
240: carrier adjuster

The invention claimed is:

1. A motor drive apparatus that detects an electric current flowing as a DC bus current of an inverter to calculate a motor current detected value and that controls a magnitude and a phase of an applied voltage of a motor according to the motor current detected value, comprising:

a carrier adjuster that decreases a carrier frequency if an average value of the DC bus current or an instantaneous value of the DC bus current is at or above a predetermined value and that increases the carrier frequency if the average value of the DC bus current or the instantaneous value of the DC bus current is at or below the predetermined value; and a pulse shift adjuster that changes an interphase waveform of a PWM pulse according to the carrier frequency;

wherein the carrier adjuster switches the carrier frequency using a hysteresis provided in the predetermined value, and wherein the predetermined value is proportional to a motor output calculated from a rotational velocity of the motor and a motor torque.

2. The motor drive apparatus according to claim 1, wherein the carrier adjuster increases the carrier frequency if a temperature of the inverter is at or below a predetermined value.

3. The motor drive apparatus according to claim 1, wherein the motor current detected value is calculated based on the increased carrier frequency.

4. The motor drive apparatus according to claim 1, wherein an electric current is detected at an integral multiple of the carrier frequency, and wherein the pulse shift adjuster changes the interphase waveform of the PWM pulse only at a time when the electric current is detected.

5. The motor drive apparatus according to claim 1, wherein the carrier adjuster switches the carrier frequency by an integral multiple of half of the carrier frequency.

6. A motor drive apparatus that detects an electric current flowing as a DC bus current of an inverter to calculate a motor current detected value and that controls a magnitude and a phase of an applied voltage of a motor according to the motor current detected value, comprising:

a carrier adjuster that decreases a carrier frequency if a value indicating a drive state of the motor is at or above a predetermined value and that increases the carrier frequency if the value indicating the drive state of the motor is at or below the predetermined value; and a pulse shift adjuster that changes an interphase waveform of a PWM pulse according to the carrier frequency;

wherein the carrier adjuster switches the carrier frequency using a hysteresis provided in the predetermined value, and wherein the value indicating the drive state of the motor is a motor output calculated from a rotational velocity of the motor and a motor torque.

7. The motor drive apparatus according to claim 6, wherein the value indicating the drive state of the motor is a rotational velocity of the motor.

8. A motor apparatus that detects an electric current flowing as a DC bus current of an inverter to calculate a motor current detected value and that controls a magnitude and a phase of an applied voltage of a motor according to the motor current detected value, comprising:

a carrier adjuster that decreases a carrier frequency if a value indicating a drive state of the motor is at or above a predetermined value and that increases the carrier frequency if the value indicating the drive state of the motor is at or below the predetermined value; and a pulse shift adjuster that changes an interphase waveform of a PWM pulse according to the carrier frequency;

wherein the carrier adjuster switches the carrier frequency using a hysteresis provided in the predetermined value, and wherein the value indicating the drive state of the motor is a motor output calculated from a rotational velocity of the motor and a motor torque.

9. The motor apparatus according to claim 8, wherein the value indicating the drive state of the motor is a rotational velocity of the motor.

10. The motor apparatus according to claim 8, wherein the carrier adjuster increases the carrier frequency if a temperature of the inverter is at or below a predetermined value.

11. The motor apparatus according to claim 8, wherein the motor current detected value is calculated based on the increased carrier frequency.

12. The motor apparatus according to claim 8, wherein an electric current is detected at an integral multiple of the carrier frequency, and wherein the pulse shift adjuster changes the interphase waveform of the PWM pulse only at a time when the electric current is detected.

* * * * *